US008548193B2

(12) United States Patent
Saund et al.

(10) Patent No.: US 8,548,193 B2
(45) Date of Patent: Oct. 1, 2013

(54) METHOD AND APPARATUS FOR NAVIGATING AN ELECTRONIC MAGNIFIER OVER A TARGET DOCUMENT

(75) Inventors: Eric Saund, San Carlos, CA (US); Lawrence C. Lee, Menlo Park, CA (US); Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1063 days.

(21) Appl. No.: 12/553,207

(22) Filed: Sep. 3, 2009

(65) Prior Publication Data

US 2011/0052015 A1 Mar. 3, 2011

(51) Int. Cl.
*G06K 9/00* (2006.01)
(52) U.S. Cl.
USPC .............................. 382/103; 382/209; 348/169
(58) Field of Classification Search
None
See application file for complete search history.

(56) References Cited

U.S. PATENT DOCUMENTS

| 5,465,303 | A | 11/1995 | Levison et al. |
| 5,465,353 | A | 11/1995 | Hull et al. |
| 5,491,760 | A | 2/1996 | Withgott et al. |
| 5,613,014 | A | 3/1997 | Eshera et al. |
| 5,850,476 | A | 12/1998 | Chen et al. |
| 6,041,133 | A | 3/2000 | Califano et al. |
| 7,359,532 | B2 | 4/2008 | Acharya et al. |
| 7,844,594 | B1 | 11/2010 | Holt et al. |
| 8,086,039 | B2 | 12/2011 | Kletter |
| 2006/0104484 | A1 | 5/2006 | Bolle et al. |
| 2006/0259524 | A1 | 11/2006 | Horton |
| 2006/0285772 | A1 | 12/2006 | Hull et al. |
| 2008/0219560 | A1 | 9/2008 | Morimoto et al. |
| 2008/0317278 | A1 | 12/2008 | Lefebvre et al. |
| 2009/0176566 | A1 | 7/2009 | Kelly |
| 2009/0244323 | A1* | 10/2009 | Carter et al. ............. 348/231.99 |
| 2009/0324026 | A1 | 12/2009 | Kletter |
| 2009/0324087 | A1 | 12/2009 | Kletter |
| 2009/0324100 | A1 | 12/2009 | Kletter et al. |
| 2010/0008589 | A1* | 1/2010 | Bober et al. ................... 382/218 |
| 2011/0173103 | A1 | 7/2011 | Batra et al. |
| 2011/0197121 | A1 | 8/2011 | Kletter |

FOREIGN PATENT DOCUMENTS

| EP | 1850270 A1 | 10/2007 |
| WO | WO2008114683 | * 9/2008 |

OTHER PUBLICATIONS

Nakai et al., "Camera-based document image retrieval as voting for partial signatures of projective invariants." Document Analysis and Recognition, 2005. Proceedings. Eighth International Conference on. IEEE, 2005.*

(Continued)

*Primary Examiner* — David Zarka
*Assistant Examiner* — David Perlman
(74) *Attorney, Agent, or Firm* — Fay Sharpe LLP (57) ABSTRACT

A method for electronically magnifying a target object with an imaging device. The method includes obtaining a full view image of the target object, where the full view image is focused. The method further includes moving the imaging device in proximity to a portion of the target object and obtaining a key image of the portion of the target object. The method further includes matching the key image to a corresponding portion of the full view image. The method further includes magnifying the corresponding portion of the full view image and displaying the magnified portion of the full view image.

20 Claims, 10 Drawing Sheets (56) References Cited

OTHER PUBLICATIONS

"Business Collaboration", Jan. 16, 2008, pp. 1-2, http://web.archive.org/web/2008/0116032852/http://web.exostar.com/solutions/collaborati . . .

"Workshare Professional", Mar. 29, 2009, pp. 1-2, http://web.archive.org/web/20090329082245/http://www.workshare.com/products/wsprofe . . .

Acrobat Professional, Adobe Systems Inc., Nov. 28, 2009, http://web.archive.org/web/20091128011910/http://www.adobe.com/products/acrobatpro/.

Baumberg, "Reliable Features Matching across Widely Separated Views" In Conference on Computer Vision and Pattern Recognition, vol. 1, pp. 774-781, 2000.

Brown et al., "Invariant Features from Interest Point Groups." In British Machine Vision Conference, BMVC 2002, Cardiff, Wales, pp. 656-665 (here typed as 253-262), Sep. 2002.

Carneiro et al., "Multi-Scale Phase-based Local Features" In Conference on Computer Vision and Pattern Recognition, vol. 1, pp. 736-743, 2003.

Compare PDF, AKS Labs, Oct. 12, 2004, http://web.archive.org/web/2004101204134:///http://www.compare-pdf.com/.

Diff PDF, AJD Software, Jan. 24, 2006; http://www.supershareware.com/diff-pdf-free/software/.

Eddins, Steve, "Intensity-Weighted Centroids", The Mathworks, Aug. 31, 2007, pp. 1-4, http://blogs.mathworks.com/steve/2007/08/31/itensity-weighted-centroids.

Florack et al., "General intensity transformations and differential invariants," In Journal of Mathematical Imaging and Vision, vol. 4, No. 2, pp. 171-187, May 1994.

Freeman et al., "The Design and Use of Steerable Filters" Transactions on Pattern Analysis and Machine Intelligence, vol. 13, pp. 891-906, 1991.

Harris et al., "A Combined Corner and Edge Detector." Proceedings of the Alvey Vision Conference, pp. 147-151, 1988.

Iwamura et al., Improvement of Retrieval Speed and Required Amount of Memory for Geometric Hashing by Combining Local Invariants, Osaka Prefecture University, Japan, 10 pages, Proc. BMVC2007 (Sep. 2007).

Kadir et al., "An Affine Invariant Salient Region Detector." Computer Vision—ECCV 2 004, pp. 228-241.

Kletter, Detection of duplicate document content using two-dimensional visual fingerprinting, U.S. Appl. No. 12/907,226, filed Oct. 19, 2010.

Kletter, Finding similar content in a mixed collection of presentation and rich document content using two-dimensional visual fingerprints, U.S. Appl. No. 12/907,251, filed Oct. 19, 2010.

Learn Acrobat 9—Comparing two PDF documents / Adobe TV, Dec. 20, 2009, pp. 1-8, http://web.archive.org/web/20091220080445/http://tv.adobe.com/watch/learn/-acrobat-9/co . . .

Ledwich et al., "Reduced SIFT Features for Image Retrieval and Indoor Localization." IEEE Transactions on Pattern Analysis and Machine Intelligence, vol. 19, No. 5, May 1997.

Lepetit et al., "Randomized Trees for Keypoint Recognition." Proceedings IEEE Computer Society Conference on Computer Vision and Pattern Recognition CVPR05, vol. 2, pp. 775-781, 2005.

Lepetit et al., "Keypoint recognition using randomized trees", IEEE-PAMI, vol. 28, No. 9, pp. 1465-1479,Sep. 2006.

Lepetit et al., "Point Matching as a Classification Problem for Fast and Robust Object Pose Estimation." In Conference on Computer Vision, pp. 128-142, Copenhagen, 2002.

Lepetit et al., "Towards Regognizing Feature Points using Classification Trees." Technical Report IC/2004/74 EPFL, 2004.

Lindeberg et al., "Feature Detection with Automatic Scale Selection." International Journal of Computer Vision, vol. 30, No. 2, pp. 79-116, 1998.

Lowe, "Distinctive Image Features from Scale-Invariant Keypoints." International Journal of Computer Vision, vol. 60, No. 2, pp. 91-110, 2004.

Mikolajczyk et al., "A performance Evaluation of Local Descriptors." In Conference on Computer Vision and Pattern Recognition, pp. 257-263, Jun. 2003, (paper shows a draft date of Feb. 23, 2005).

Mikolajczyk et al., "An Affine Invariant Interest Point Detector." In European Conference on Computer Vision and Pattern Recognition, vol. 1, pp. 128-142, 2002.

Nakai et al., Hashing with Local Combinations of Feature Points and Its Application to Camera-Based Document Image Retrieval—Retrieval in 0.14 Second from 10,000 Pages—, Graduate School of Engineering, Osaka Prefecture University, Japan, pp. 87-94, , Proc. First International Workshop on Camera-Based Document Analysis and Recognition (CBDAR2005), pp. 87-94 (Aug. 2005).

Nakai et al., Use of Affine Invariants in Locally Likely Arrangement Hashing for Camera-Based Document Image Retrieval, Graduate School of Engineering, Osaka Prefecture University, Japan, pp. 1-12, Lecture Notes in Computer Science (7th International Workshop DAS2006), 3872, pp. 541-552 (Feb. 2006).

Neuwirth et al., "Flexible Diff-ing in a collaborative Writing System," Carnegie Mellon University, Pittsburgh, PA 15213, CSCW 92 Proceedings November, pp. 147-154.

Nuance, Comparing PDF Documents, 2002-2010 Nuance Communications, Inc., Jul. 7, 2009, pp. 1-2.

Pilet et al., "Fast Non-Rigid Surface Detection, Registration and Realistic Augmentation." International Journal of Computer Vision, Springer 2007.

Schaffalitzky et al., "Multi-View Matching for Unordered Image Sets or How do I Organize My Holiday Snaps" In European Conference on Computer Vision, vol. 1, pp. 414-431, 2002.

Schmid et al., "Local Greyvalue Invariants for Image Retrieval." IEEE Transaction on Pattern Analysis and Machine Intelligence, vol. 19, No. 5, May 1997.

Vaibhac, Compare Documents Side-By-Side in Excel and Word, Apr. 9, 2008, pp. 1-2.

Viola et al., "Rapid object detection using a boosted cascade of simple features." In Proceedings of Computer Vision and Pattern Recognition CVPR, vol. I, pp. 511-518, 2001.

Workshare Professional, WorkShare Inc., Apr. 15, 2005, http://web.archive.org/web/20050415102858/http://www.workshare.com/products/wsprofessional/.

Yan Ke et al., "PCA-SIFT: A More Distinctive Representation for Local Image Descriptors." In Conference on Computer Vision and Pattern Recognition, pp. 111-119, 2000.

"AJC Diff", Jun. 19, 2008, http://web.archive.org/web/20080619081259/http://www.ajcsoft.com/ProductsAJCDiff.php.

Eisenberg, A. "The Magnifying Glass Gets an Electronic Twist". May 25, 2008, http://www.nytimes.com/2008/05/25/technology/25novel.html?r=3&ref=technology&oref=slogin&oref=slogin&oref=slogin 2 pages.

GW Micro-Catalog-Magnifiers—Portable SenseView Duo. https://www.gwmicro.com/Catalog/Magnifiers/?moreInfo=8131-001-Duo 1 page.

GW Micro-Catalog-Magnifiers—Portable SenseView P430. https://www.gwmicro.com/Catalog/Madnifiers/?moreInfo=8131-001 1 page.

QuickLook. http://www.freedomvision.net/1%20QuickLook.html 2 pages.

QuickLook Classic. http://www.freedomvision.net/1%20QuickLook%20Basic.html 3 pages.

QuickLook Focus. http://wwww.freedomvision.net/1%20QuickLook%20Focus.html 3 pages.

Nakai et al. "Camera-Based Document Image Retrieval as Voting for Partial Signatures of Projective Invariants". Proceedings of the 2005 Eight International Conference on Document Analysis and Recognition (ICDAR'05) IEEE, © 2005, 5 pages.

\* cited by examiner

METHOD AND APPARATUS FOR NAVIGATING AN ELECTRONIC MAGNIFIER OVER A TARGET DOCUMENT

BACKGROUND

The present application relates generally to methods and/or systems for electronically magnifying a target object, such as the page of a book. Electronic magnifiers perform image processing in real time to display a magnified image of the target object and are particularly useful to the visually impaired. The devices allow the visually impaired to see small writing in long and short documents, such as medicine bottles, recipes, menus, food labels, correspondences, books and magazines.

While the visually impaired have traditionally made use of magnifying glasses, electronic magnifiers have a number of benefits that make them more attractive than traditional magnifiers. See Anne Eisenberg, *The Magnifying Glass Gets an Electronic Twist*, N.Y. TIMES, May 25, 2008. Namely, electronic magnifiers have the ability to modify contrast, brightness, hue, etc., which traditional magnifiers lack. Additionally, electronic magnifiers have the ability to change the color of backgrounds and lettering. For example, electronic magnifiers can change black lettering and a white background to a black background and white lettering, which may be advantageous to people with macular degeneration.

However, there are two main hurdles holding electronic magnifiers back: cost and usability. These hurdles stem from a need to properly focus on the target object. Naturally, a magnifier isn't useful if it cannot provide a clear, magnified image. Illustrating these hurdles, two known approaches to achieving electronic magnification are presented.

One approach is to adjust magnification by moving the device closer/farther to/from the target object. This approach relies on an autofocus lens capable of adjusting focus over a large range of small distances. The usability of this approach is very high because it closely approximates a magnifying glass and is intuitive to use. However, this approach is quite costly, relative to a traditional magnifying glass, due to the fact that it requires an autofocus lens. Additionally, most existing imaging devices, such as camera phones, lack such an autofocus lens. One would have to purchase a separate device equipped with an autofocus lens to carry out this approach. Thus, this approach has high usability, but the usability comes at the price of a high cost.

Another approach is to hold a camera far enough from the target object such that the target object can be imaged in focus. With such an approach, the user simply uses manual controls to adjust the zoom of the image. Likewise, the user simply pans by moving the imaging device. As should be apparent, this approach is beneficial in that it does not require an expensive lens and is compatible with most existing imaging devices. Namely, one could make use of their camera phone and/or some other portable handheld device they already own. However, this approach presents challenges to the user because at useful magnifications, small directional changes will move the field of view of the camera a large amount, and the image will be shaky. Thus, this approach does not have a high usability, but it is relatively inexpensive.

In view of the foregoing discussion, an approach that is both inexpensive and highly usable is desirable. The present application contemplates a new and improved system and/or method which overcomes the above-referenced problems and others.

INCORPORATION BY REFERENCE

The disclosures of U.S. patent application Ser. No. 12/147,624 for "Method and System for Finding a Document Image in a Document Collection Using Localized Two-Dimensional Visual Fingerprints," by Doron Kletter et al., filed Jun. 27, 2008; and U.S. patent application Ser. No. 12/163,186 for "System and Method for Finding a Picture Image in an Image Collection Using Localized Two-Dimensional Visual Fingerprints," by Doron Kletter et al., filed Jun. 27, 2008, are each hereby incorporated herein in their entireties.

BRIEF DESCRIPTION

In accordance with one aspect of the present application, a method for electronically magnifying a target object with an imaging device is provided. The method includes obtaining a full view image of the target object and moving the imaging device in proximity to a portion of the target object. The method further includes obtaining a key image of the portion of the target object and matching the key image to a corresponding portion of the full view image. The method further includes magnifying the corresponding portion of the full view image and displaying the magnified portion of the full view image.

In accordance with another aspect of the present application, an apparatus for electronically magnifying a target object is shown. The apparatus includes an image sensor, a display, and a controller. The controller is operative to obtain a full view image of the target object from the image sensor and operative to obtain a key image of a portion of the target object from the image sensor. The controller is further operative to match the key image to a corresponding portion of the full view image and is operative to magnify the corresponding portion of the full view image. The controller is further operative to provide the display with a video stream of the magnified portion of the full view image.

In accordance with another aspect of the present application, a method for electronically magnifying a target object with an imaging device is provided. The method includes moving the imaging device in proximity to a portion of the target object and obtaining a key image of the portion of the target object. The method further includes sending the key image to a database service. The database service includes means for matching the key image to a corresponding portion of a full view image in one of at least one databases associated with the database service. The method further includes obtaining the matched full view image from the database service and magnifying the corresponding portion of the full view image. The method further includes displaying the magnified portion of the full view image.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

The present application relates to an imaging device and method for electronically magnifying a target object. The target object is preferably a large or small document, such as, but not limited to, the page of a book, a medicine bottle label, or other like documents. Among other things, the application seeks to expand upon existing electronic magnifiers by providing a highly usable, low cost approach to electronic magnification. The described concepts enable existing mobile devices, such as a camera phone, to carry out the exemplary methods of the application. As will be discussed in connection with the imaging device of FIG. 1 and the methods of FIG. 2 and FIG. 9, on aspect of the present application accomplishes these objectives by finding a low quality image within a high quality image and displaying a portion of the high quality image corresponding to the low quality image.

Figure 1:
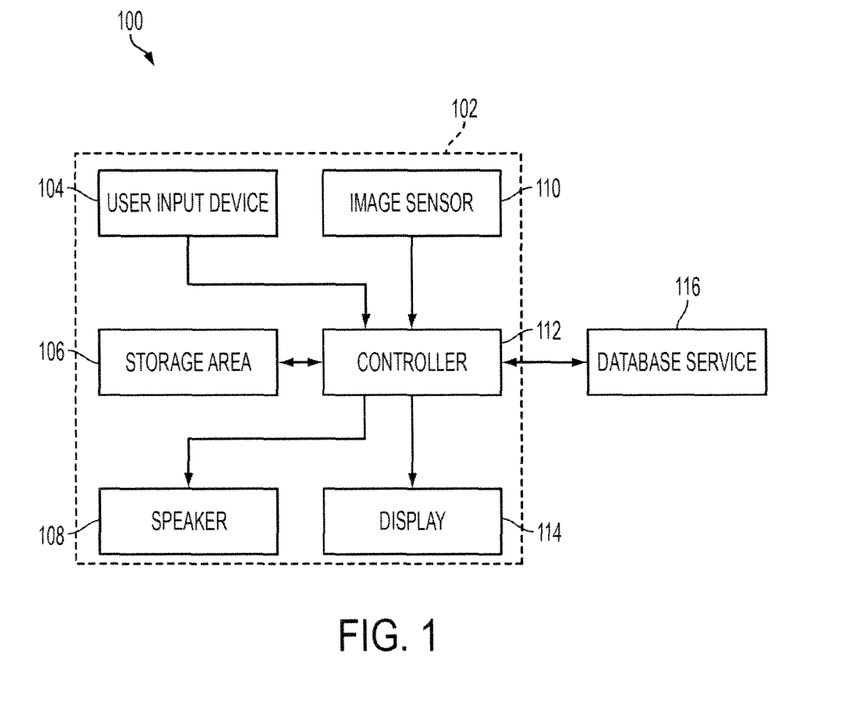
FIG. 1 is a system level diagram of an exemplary imaging device for electronically magnifying a target object according to the present application.

With reference to FIG. 1, a system level overview 100 of an imaging device 102 capable of carrying out the exemplary methods of the present application is shown. The imaging device 102 includes, but is not limited to, the following: a user input device 104, a storage area 106, an image sensor 110, a controller 112, and a display 114. The imaging device 102 may be a camera phone, e.g., an iPhone, a digital camera or any other like device, and is preferably portable. The user input device 104 may be a button, switch, knob, touch screen display, or other like device. The storage area 106 may be RAM, Flash Memory, a hard drive or other like storage means. The image sensor 110 may be a camera, scanner, or other like device. Preferably, the image sensor 110 is capable of capturing images at resolutions greater than 2 megapixels. The controller 112 is used loosely to refer to the logic necessary to implement the exemplary method of the present application. The controller 112 may be a microcontroller, FPGA, ASIC, gate array, DSP, or any other like devices. The display 114 may be a CRT, an LCD, a plasma, or other like display capable of displaying a video stream. Additionally, the imaging device 102 optionally includes a speaker 108 for providing the user of the imaging device 102 with audio messages.

FIG. 1 further includes an optional database service 116 for use with one of the exemplary methods of the present application. The database service 116 includes, or is connected to, at least one database of images. The database service 116 is preferably connected to the imaging device 102 via a network, where the network may be comprised of a series of wires. Additionally or in the alternative, the network may be comprised of one or more wireless access points. Under the preferred embodiment, the database service 116 and the imaging device 102 are connected to one another via the internet. However, this need not necessarily be the case, and the database service 116 and the imaging device 102 may be connected by a private network, such as a corporate network or personal home network. Notwithstanding the type of network, the imaging device 102 is preferably connected to the network via a wireless access point. This advantageously allows the imaging device 102 to maintain mobility and portability, thereby promoting a greater level of usability than would otherwise be present with a wired connection. Alternatively, instead of being networked, the database service 116 may be internal to the imaging device 102.

FIG. 1 also shows the general flow of communications between the aforementioned components. The flow of communications will be discussed in detail in the following discussion of FIG. 2 and FIG. 9. However, as a general matter, images flow from the image sensor 110 to the controller 112, where the controller 112 stores the images in the storage area 106 and/or processes the images. Additionally, user input from the user input device 104 generally flows to the controller 112, where the controller 112 reacts to the user input. The controller 112 provides the display 114 with a video stream. Images optionally flow between the controller 112 and the database service 116. Likewise, the controller 112 optionally provides an audio stream to the speaker 108. The audio stream and/or the video stream allow the controller 112 to communicate with a user of the imaging device 102.

Figure 2:
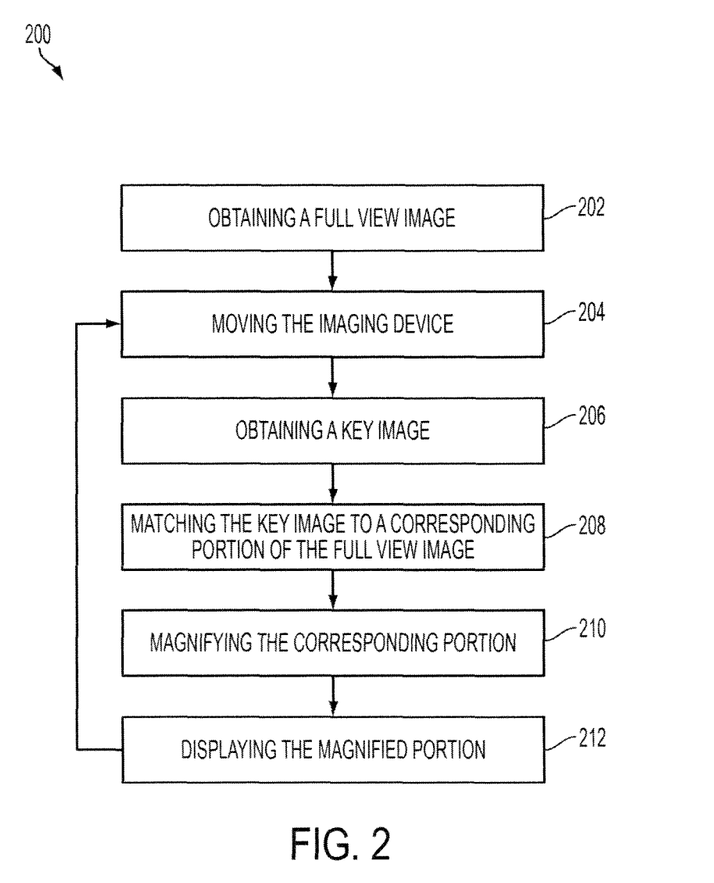
FIG. 2 is an exemplary method for electronically magnifying a target object with an imaging device according to the present application.

With reference to FIG. 2, the exemplary method 200 of the present application for electronically magnifying a target object with an imaging device 102 is shown. The exemplary method 200 serves to facilitate a low cost, highly usable solution to the problems associated with other electronic magnifiers. The exemplary method 200 of the present application includes the following steps: obtaining a full view image of a target object (Step 202); moving the imaging device in proximity to the target object (Step 204); obtaining a key image of a portion of the target object (Step 206); matching the key image to the corresponding portion of the full view image (Step 208); magnifying the corresponding portion of the full view image (Step 210); and displaying the magnified portion (Step 212). The exemplary method 200 illustrated in FIG. 2 will be described in detail below, and FIGS. 3-8 will be used to illustrate the steps of the exemplary method 200. The system 100 of FIG. 1 and the flow of messages between the components will also be described in unison within the following discussion. As mentioned above, the exemplary method 200 is preferably carried out by the controller 112 of the imaging device 102.

The first step for performing the exemplary method 200 of the present application is to obtain a full view image of the target object from the imaging sensor 110 (Step 202). Preferably, the target object is a document, e.g., a page of a book. This step includes capturing the current view of the image sensor 110 and storing the captured view to the storage area 106. As a general matter, and as will be discussed below, this step requires user interaction and user input from the user input device 104 to obtain the full view image of the target object.

The full view image serves as the source of images displayed to the user. Namely, as will be discussed in more detail below, the exemplary method 200 indexes into a portion of the full view image and performs magnification on that portion. This magnified portion is then displayed to the user on display 114. Accordingly, the full view image is preferably of as high of quality as possible. Among other things, the full view image should be well focused and well lit. Moreover, the full view image should include as much detail as possible, e.g., the highest resolution possible. Under one embodiment, the full view image is at least 2 megapixels. In other words, the image sensor 110 should be able to capture images at resolutions of 2 megapixels or more. It is considered that in certain embodiments, if the full view image is a low resolution image, magnification may be blurry. Notwithstanding the image quality, the full view image should also encompass as much of the target object as possible. Naturally, because the user is displayed portions of the full view image, if the full view image does not include the entire target object, there will be portions of the target object that the user is unable to magnify.

To help the user obtain a quality full view image, the user may optionally be presented with audio and/or visual warnings. Under the preferred embodiment, an audio stream and/or a video stream are sent to the speaker 108 and/or display 114, respectively, to aid the user. Among other things, these warnings may be used to notify the user as to whether the full view image is focused and/or to notify the user how to correct the issue, e.g., zoom out. Additionally, the warnings may be used to alert the user as to whether the target object is fully within the current view of the image sensor 110 and/or what specific action to take to correct the issue, e.g., move left. As is known in the art, detecting whether the target object is in the current view can be accomplished by detecting page boundaries. However, it should be appreciated that the present application is not limited to providing user assistance on whether the target object is focused or centered. Rather, user assistance may encompass any other conditions affecting the full view image, such as lighting, contrast, and other like conditions.

Figure 3:
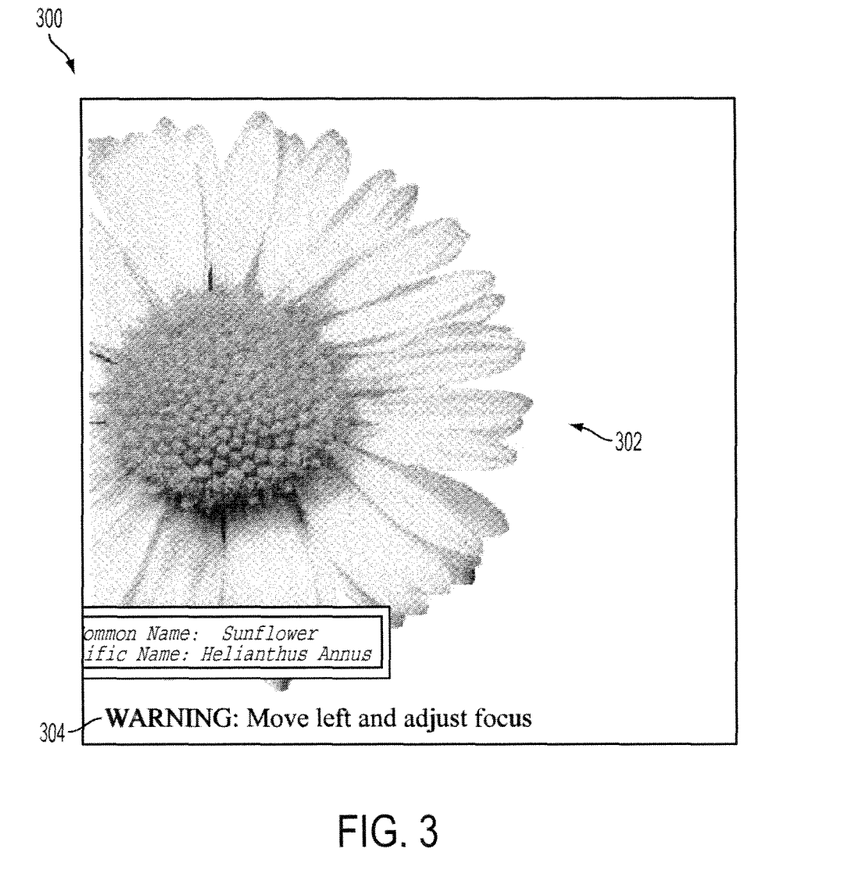
FIG. 3 is an illustration of a display view when the user is capturing a full view image of a target object.

With reference to FIG. 3, a display view 300 of display 114 is shown as a user might see when trying to obtain a full view image. That is to say, when the user is obtaining a full view image with the imaging device 102, such as a camera phone, the display 114 on the imaging device 102 might appear as shown in FIG. 3. Therein, the user is trying to obtain a full view image (e.g., page of a book showing picture of a flower and text identifying flower by Common Name and Scientific Name) and is shown as display image 302. The display image 302 is simply the current view of the image sensor 110 and changes as the current view of the image sensor 110 changes. However, the user is off center and slightly out of focus. Accordingly, the user is provided with a visual warning 304 of these two issues, and, in the case of being off center, provided an instruction on how to correct the issue, i.e., move left. When the user corrects the issue of focus and moves to the left, the display 114 is preferably updated such that the warning message 304 will go away. Also, although not shown, the visual warning 304 message of FIG. 3 may be accompanied by an audio warning by way of speaker 108. Alternatively, the visual warning 304 of FIG. 3 may be replaced with an audio warning.

Figure 4:
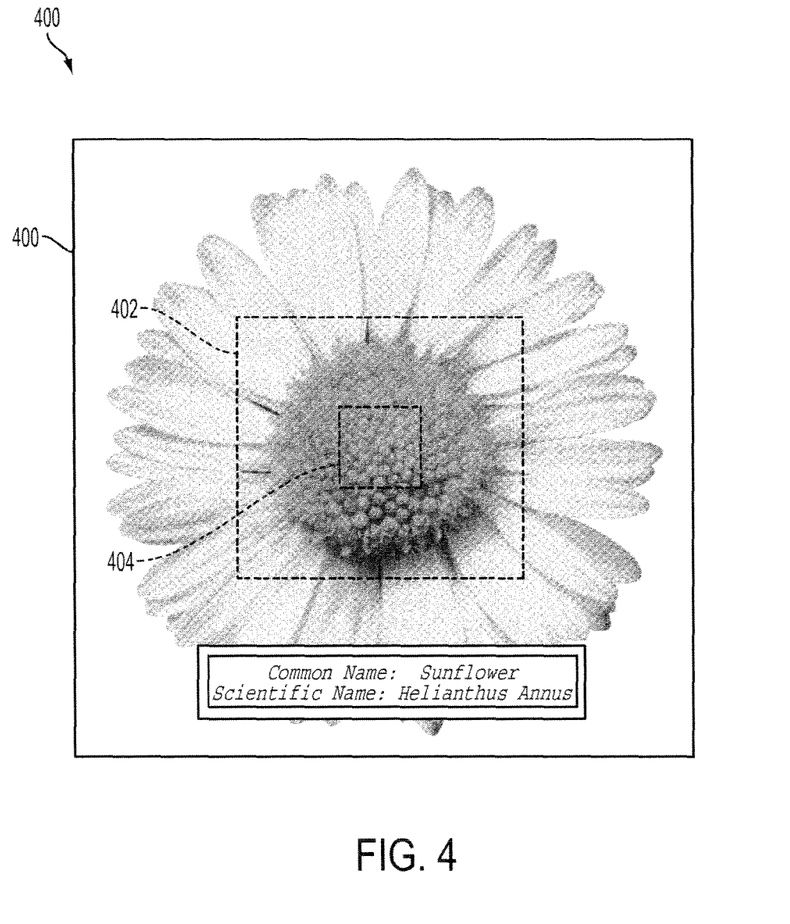
FIG. 4 is an illustration of a full view image of the target object of FIGURE 3.

Once any issues surrounding the current view of the image sensor 110 are addressed, the user may capture the full view image by way of the user input device 104. That is to say, the user may provide user input with the user input device 104, e.g., pressing a button on the imaging device 102, which captures the current view of the image sensor 110. Button is used loosely and refers to physical buttons, virtual buttons, e.g., buttons on a touch screen, or any other like input device. Alternatively, the imaging device 102 implementing the exemplary method 200 of this application may automatically capture the full view image when it determines the full view image is of high quality. However, regardless of how the full view image is captured, the captured image is stored to the storage area 106 such that it can be recalled later in the exemplary method 200. As discussed above, the storage area 106 may be RAM, flash, a hard drive, or any other like mediums. FIG. 4 shows a captured full view image 400 of the textual material mentioned with reference to FIG. 3. The dashed boxes 402, 404, however, are not part of the full view image 400 and should be ignored for the time being; the dashed boxes 402, 404 will be discussed later. As should be apparent, the full view image 400 is centered, well lit, and clear, i.e., it is a high quality image of the target object.

After the full view image has been obtained, the user preferably moves imaging device 102 in proximity to a portion of the target object they want to magnify (Step 204). Accordingly, when the imaging device 102 is moved in proximity to the target object, the imaging sensor 110 should be positioned so the current view of the imaging sensor 110 includes the portion of the target object. As a general matter, the image sensor 110 will include a lens operative to focus light for capture. Thus, for example, if one is using the exemplary method 200 of the present application with a camera phone, the lens of the camera phone should be positioned in proximity to, and directed at, the portion of the target object. Images captured by the image sensor 110 while in proximity to the portion of the target object will generally be out of focus and blurry because, under most circumstance, the imaging device 102 will be so close to the target object that the lens of the imaging device 102 is unable to focus on the target object. This follows because most imaging 102 devices are not equipped with an autofocus lens capable of adjusting focus over a large range of small distances. However, that is not to say that the exemplary method 200 of the present application will not work with focused images.

Figure 5:
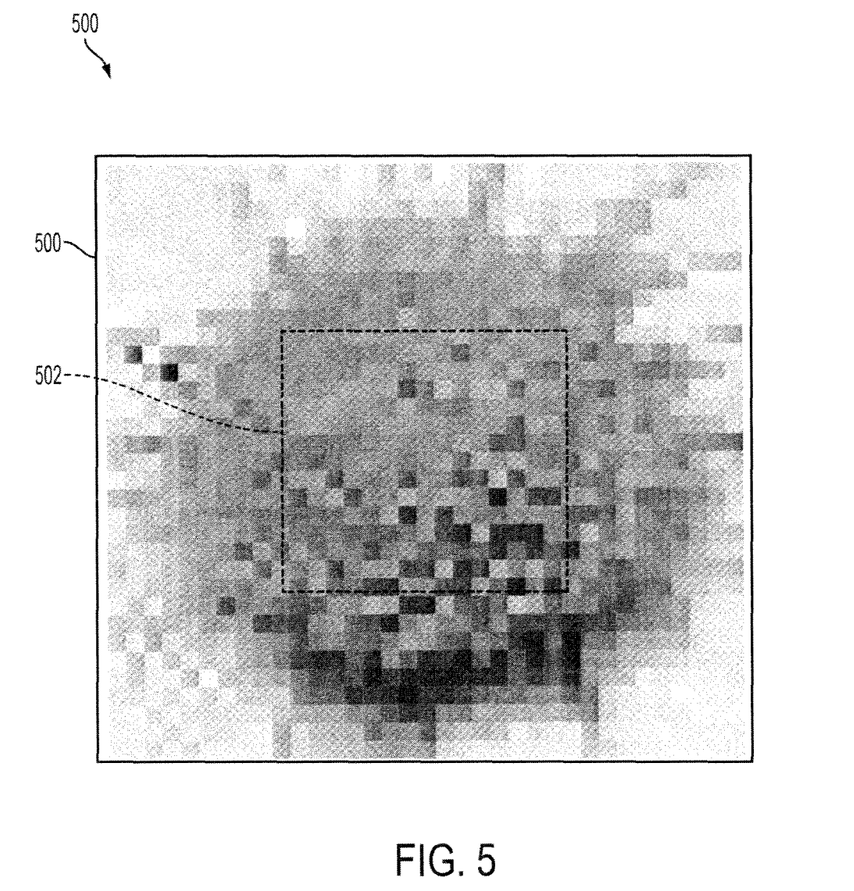
FIG. 5 is an illustration of a key image of a portion of the target object of FIG. 3.

As set forth in FIG. 2, with the imaging device in proximity to the target object (Step 204), an image of the portion of the target object the user wants to magnify is obtained (Step 206). This image is referred to as a key image and is used to index into the full view image previously obtained. With reference to FIG. 5, an example key image 500 of the textual material previously mentioned is shown. The key image 500 of the image is blurry, as will often be the case when the imaging device which obtained the key image does not include an auto focus lens capable of focusing in proximity to the target object. FIG. 5 further includes a dashed square 502 around the center of the key image 500. As will be discussed in more detail in subsequent steps, this square corresponds to the portion of the target object to be displayed after magnification.

With continuing reference to FIG. 2, upon obtaining the key image (Step 206), the key image is used to index into the full view image previously obtained (Step 208), i.e., the key image is matched to a corresponding portion of the full view image. Thus, the full view image is basically searched for the key image. This task is preferably accomplished using fingerprint matching as described in U.S. patent application Ser. No. 12/147,624 and U.S. patent application Ser. No. 12/163,186, each incorporated herein by reference. However, it should also be appreciated matching the key image to a corresponding portion of the full view image can employ hybrid of visual motion tracking and fingerprint matching. Under the hybrid approach, fingerprint matching works in the background, at a somewhat slower speed, to match the key image to a corresponding portion of the full view image. Visual motion tracking, on the other hand works at a faster pace and provide a smooth tracking of the magnified portion of the full view image as the imaging device 102 moves over the target object. This hybrid approach advantageously allows seamless magnification as the imaging device 102 is moved over nearly white regions of the target object where few fingerprints are available.

A concept of fingerprint matching is to compare the fingerprints of the key image with those of the full view image. Fingerprints, like their human counterparts, are generally unique to an image. Accordingly, by finding the portion of the full view image with fingerprints matching those of the key image, it can be determined where within the full view image the key image corresponds.

Fingerprints are constructed as sequences of quantized, transformation-invariant 2D ratios, called persistent ratios, which are derived from the relative 2D positions of a given keypoint and its (N−1) nearest-neighbor keypoints. Thus each fingerprint is localized to a small image neighborhood around the keypoint of interest. A fingerprint sequence is dependent only on the relative 2D geometry between the keypoint of interest and its (N−1) closest keypoint neighbors. The number of neighbors N is a design parameter that influences the fingerprint strength.

Figure 6A:
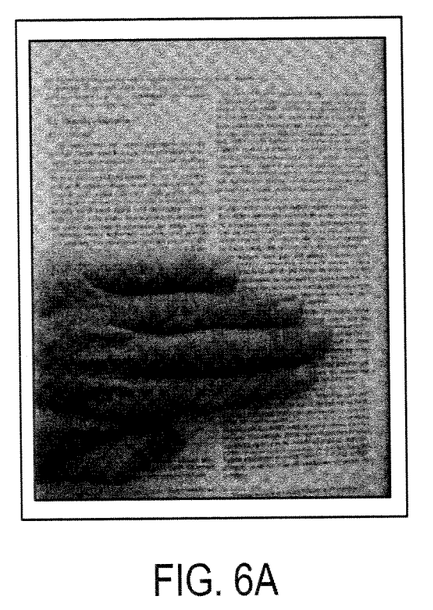
FIG. 6A is an illustration of a sample image.
Figure 6B:
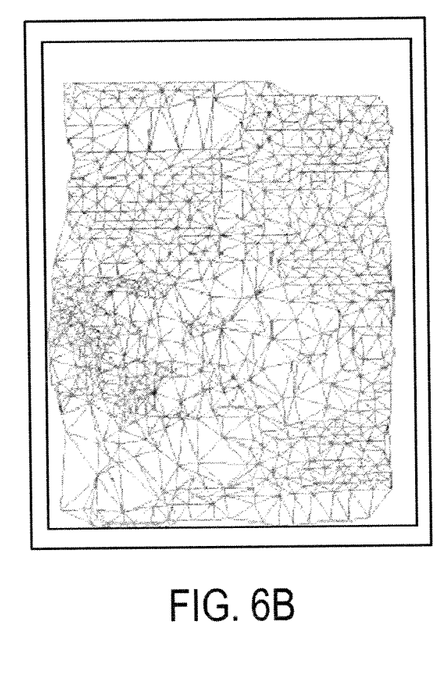
FIG. 6B is an illustration of the key points of the sample image of FIG. 6A.

Keypoints are a consistently identifiable aspect of an object in an image. For images of documents, good keypoints are word pixel mass centroids or end points of a presented image. The keypoints are derived from the object appearance at particular interest points using localized image features. The keypoints are invariant to image scale and rotation, and are robust to changes in illumination, noise, occlusion, and small changes in viewpoint. In addition, keypoints are highly distinctive, relatively easy to extract with low probability of mismatch, and are easy to match against a (possibly large) database of local image features in close to real-time performance. FIG. 6A illustrates a sample image and FIG. 6B illustrates corresponding keypoints for that image.

Figure 7A:
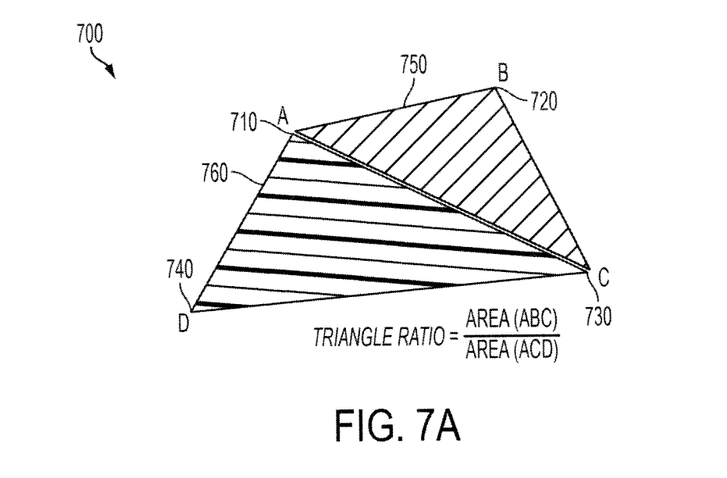
FIG. 7A illustrates the method of obtaining a Triangle Ratio for construction of Fingerprints.

As illustrated in FIG. 7A, it is well known in the art that for any given polygram 700 comprised of four non co-linear points {A, B, C, D} (i.e., 710, 720, 730, 740), on the object surface, comprising a triangle ABC 750 and a second triangle ACD 760, the ratio of triangle areas (ABC/ACD) 770 remains constant under any affine transformation. Hence only P=4 points are needed to calculate one triangle area ratio, illustrated as the Triangle Ratio 770. This affine transformation has been shown to provide an acceptable model for describing the camera to planar object geometry in many practical situations.

Alternatively, for situations where a transformation order larger than affine is required to describe the image model, the transformation can be extended to handle perspective transformation using P=5 points (instead of 4) to calculate a single persistent ratio which is the product of two triangle ratios.

Figure 7B:
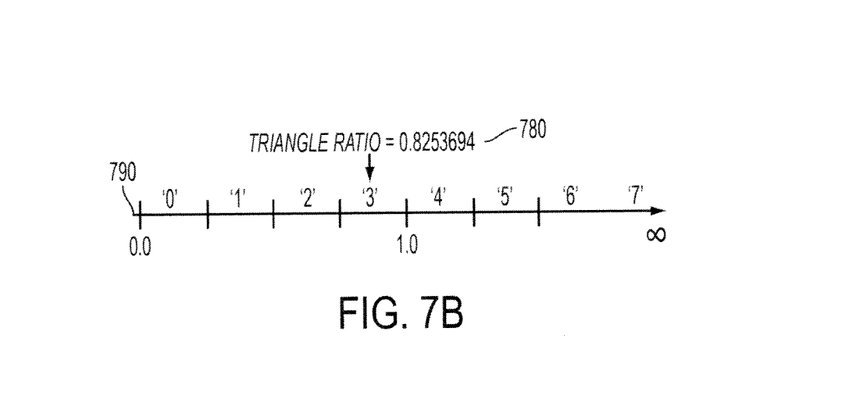
FIG. 7B is the Quantization of the Triangle Ratio of FIG. 7A.

A single fingerprint is therefore comprised of a sequence of quantized persistent transformation ratios for a group of N nearest neighbor keypoints sorted in clockwise order. To keep the fingerprint size small, the transformation ratio is quantized to Q-levels 780. Alternatively, the value of Q can be conveniently chosen to be a binary power of two. In FIG. 7B, the quantization process is illustrated as the Quantization of the Triangle Ratio 770 of FIG. 7A for the case of Q=8. The valid range (0,∞) of a Triangle Ratio before quantization is divided into Q=8 intervals labeled '0' to '7' as shown in FIG. 7B (790). The interval boundaries are determined empirically to provide approximately uniform distribution of quantization labels over a large set of representative documents. The incoming triangle ratio value 780 is sequentially compared with increasing interval boundaries to determine the first higher or equal interval boundary, upon which the process is terminated and the corresponding label interval is assigned as the quantized result. For example, an incoming triangle ratio of 0.8253694, being less than 1.0 and higher than the previous interval boundary, is assigned a quantized value of '3'.

Referring back to FIG. 4, the key image 500 of FIG. 5 corresponds to the portion of the full view image in the outer dashed box 402. In other words, the key image 500 of FIG. 5 is of the same portion of the target object as the portion of FIG. 4 surrounded by the outer dashed box 402. Additionally, the inner dashed box 404 corresponds to the dashed box 502 in FIG. 5. Thus, the fingerprints of the key image 500 in FIG. 5 mostly closely match the fingerprints of the outer dashed box 402 in FIG. 4. Between FIG. 4 and FIG. 5, it should be appreciated that the portion of the full view image surrounded by the outer dashed box 402 of FIG. 4 is much clearer than the key image 500 of FIG. 5.

After the portion of the full view image corresponding to the key image has been located (Step 208), the portion is magnified as called for by the user (Step 210). Magnification is based on the full view image such that all magnification is with respect to the full view image in its entirety, e.g., 1× magnification refers to the whole full view image. Additionally, magnification is centered on the corresponding portion of the full view image. With reference to FIG. 4, the inner dashed box 404 corresponds to the magnified portion of the full view image. This magnified portion is what will be displayed to the user. As magnification increases, the inner dashed box 404 gets smaller. Conversely, as magnification decreases, the inner dashed box 404 gets larger.

The user may adjust the magnification in any number of ways. Under one embodiment, magnification is determined based on whether the distance of the imaging device 102 from the target object is within one of a plurality of fixed ranges of distances, where a fixed range of distances corresponds to a magnification, e.g., 2×. Distance is preferably estimated by fitting an affine transformation between matching keypoints of the full view image and the key image, and reversing it to estimate relative distance. As should be appreciated, keypoints are determined when performing fingerprint matching. Thus, for example, presuppose a fixed range of 3 to 5 centimeters that corresponds to 3× magnification. If the imaging device 102 is estimated to be 4 centimeters from the target object, a magnification of 3× would be used. The user can move the imaging device 102 over the target object and within the range corresponding to the current magnification, and get a uniform level of magnification. This advantageously insures that slight vibrations of the user's hand while moving the imaging device over the target object do not translate into variations in the magnification of the target object.

An alternative method of determining magnification is to continuously adjust the magnification based on the distance of the imaging device 102 from the target object. Under such an embodiment, the magnification is inversely proportional to the distance of the imaging device 102 from the target object. As mentioned above, the distance of the imaging device from the target object can be determined by fitting an affine transformation. Accordingly, the closer the imaging device 102 is to the target object, the greater the level of magnification. Conversely, the farther the target object was from the imaging device 102, the lesser the magnification. Along these lines, limits on the magnification may be appropriate, such that once the distance exceeds a limit (upper and/or lower), the magnification is fixed at a predefined magnification.

Figure 8:
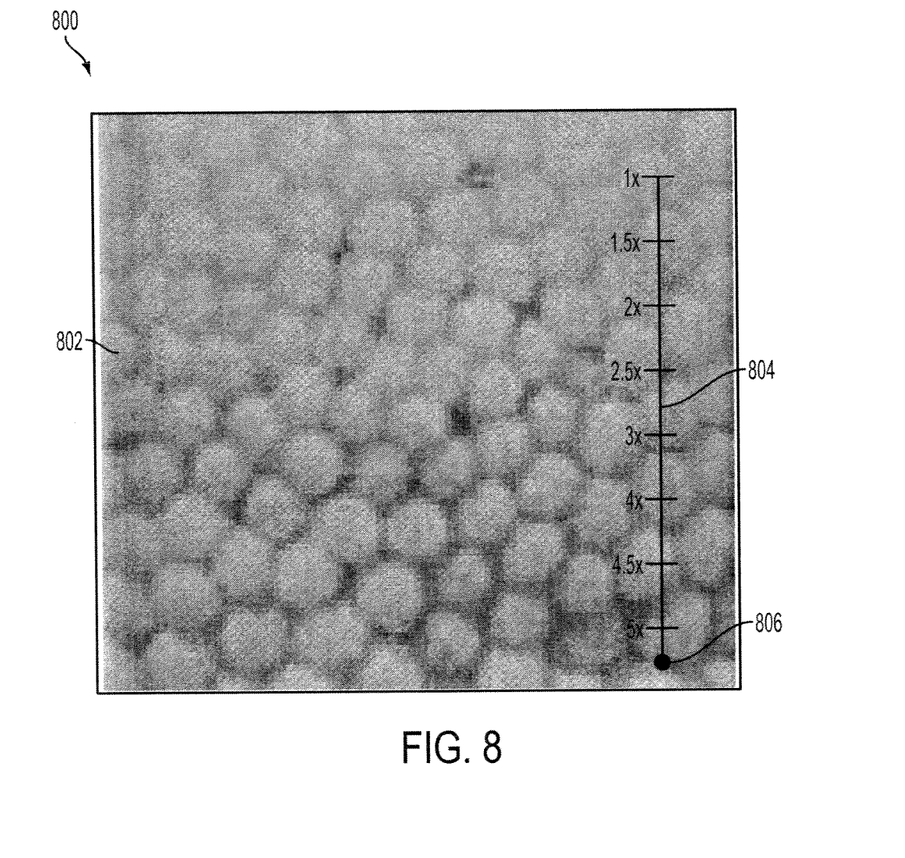
FIG. 8 is an illustration of a display view, wherein the display view is showing a magnified portion of the full view image of FIG. 4.

Notwithstanding the preceding two methods of adjusting the magnification, the user may also have the option to adjust the magnification using the user input device 104. Among other things, the user input device 104 may include buttons, sliders, thumb wheels, and/or other like means. Moreover, the user input device 104 may be implemented through physical means or virtual means, e.g., a touch screen display button. With reference to FIG. 8, a display view 800 is shown containing a touch screen slider bar 804 the user can use to adjust the magnification. Therein, the user adjusted the magnification to 5x, as indicated by position indicator 806.

After the portion of the full view image is magnified (Step 210), it is displayed to the user (Step 212). This is accomplished with the controller 112 providing the display 114 with a video stream containing display images of the magnified portion of the full view image. If the display 114 is running at a different resolution than the magnified portion, the magnified portion will be electronically scaled to fit the display. With reference to FIG. 8, the magnified portion of the full view image 802 is displayed with 5× magnification. This is a magnified portion of the textual material used in preceding illustrations. As should be apparent, this looks much better than the corresponding region 502 in the key image 500 of FIG. 5, i.e., the inner dashed box. Notwithstanding that an imaging device 102 implementing the exemplary method 200 of the present application would generally not be able to focus at such a magnification, the exemplary method 200 of the present application produced a clear, usable image.

Upon displaying the magnified portion of the full view image (Step 212), the method, starting with moving the imaging device (Step 204), is repeated such that the display 114 is continuously updated. This advantageously allows the user to move the imaging device 102 over the target object to change which portion of the full view is being magnified. If the target object is a book, for example, this allows the user to move the imaging device 102 from left to right and up and down the page while magnifying. Thus, the user can advantageously read a book from the display 114 of the imaging device 102 in magnified form. This is especially useful for those that have trouble seeing or don't have their reading glasses with them.

Figure 9:
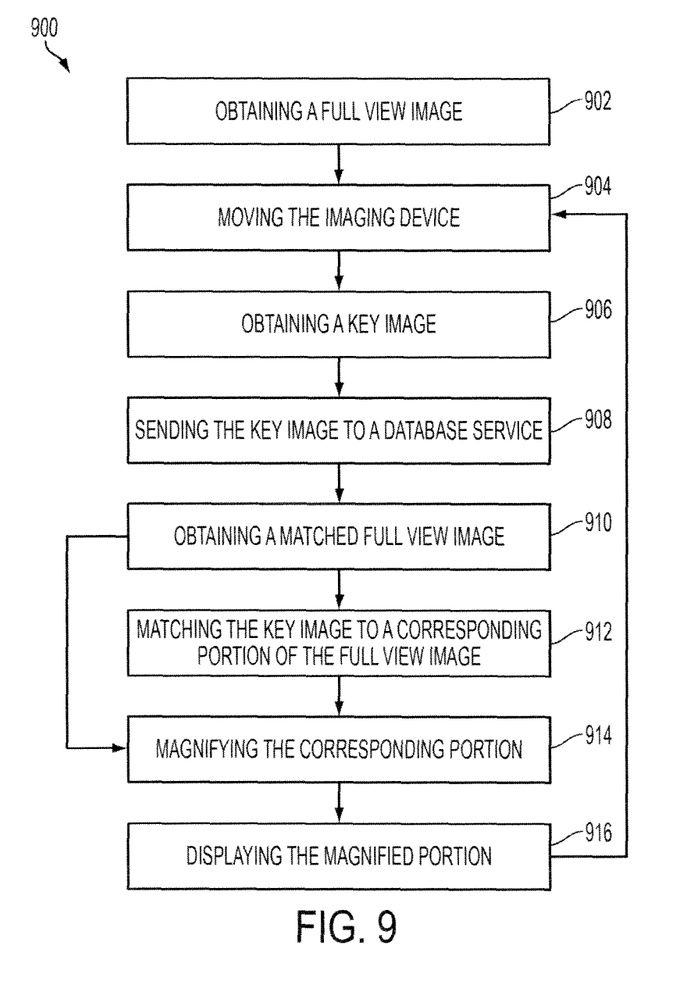
FIG. 9 is another exemplary method for electronically magnifying a target object with an imaging device according to the present application.

With reference to FIG. 9, the present application includes an alternative exemplary method 900. The alternative exemplary method includes the following steps: moving the imaging device in proximity to the target object (Step 904); obtaining a key image of a portion of the target object (Step 906); sending the key image to a database service to match the key image to a corresponding portion of an image in a database (Step 908); obtaining the matched full view image from the database service (Step 910); magnifying the corresponding portion of the full view image (Step 914); and displaying the magnified portion (Step 916). The alternative exemplary method may optionally include matching the key image to the corresponding portion of the full view image (Step 912) and obtaining a full view image of a target object (Step 902). Although this exemplary method 900 is presented independent of the exemplary method 200 in FIG. 2, there is a lot of overlap between the two exemplary methods. Accordingly, when appropriate, a step will merely be described with reference to the corresponding step of FIG. 2. Additionally, it should be appreciated that the system 100 of FIG. 1 includes the ability to carry out this exemplary method 900.

With respect to moving the imaging device 102 in proximity to a portion of the target object (Step 904), this step remains the same as Step 204 of FIG. 2. The user moves the imaging device 102 in proximity to a portion of the target object they want to magnify, such that the portion of the target object is within the current view of the imaging sensor 110. Likewise, the key image is obtained (Step 906) in the same way as called for in Step 206 of FIG. 2.

After obtaining the key image from the imaging sensor 110 (Step 906), the key image is sent to a database service 116 (Step 908). As should be appreciated, this is where the exemplary method 200 of FIG. 2 and this exemplary method 900 diverge. A database service 116 searches one or more databases of full view images for the key image. Under the preferred embodiment, the document service 116 searches for key images using the fingerprint matching technology incorporated herein by reference and discussed above. Naturally, the primary difference between implementation of the fingerprint matching above described and the fingerprint matching used by the database service 116 is that instead of search a single image, the database service 116 searches multiple images. Using a database service 116 to retrieve a full view image advantageously allows a user access to a higher quality images than would otherwise be possible. Namely, those that maintain one or more databases of full view images associated with the database service 116 will likely have better equipment than the user, e.g., a higher resolution imaging sensor. In the case of rounded items such as a medicine bottle, the database service 116 could also allow the user access to a flat label.

If the database service 116 finds a matching full view image, the imaging device 102 obtains the full view image from the database service 116 (Step 910). Additionally, the imaging device 102 preferably obtains the location of the portion of the full view image corresponding to the key image. This advantageously saves the imaging device 102 the trouble of having to search the obtained full view image for the key image. This received full view image is then saved in the storage area 106 so that it may be recalled for use with other key images. This stems from the cyclic nature of the exemplary method of the present application. Namely, that the imaging device 102 is continuously capturing key images and updating the display 114.

After the full view image has been obtained from the database service 116 (Step 910), the key image is optionally matched to a corresponding portion of the full view image using the fingerprint matching technology (Step 912), described above. This step will be employed if the location of the portion of the full view image corresponding to the key image is not returned by the database service 116. Additionally, this step will be carried out in the same way as Step 208 of FIG. 2, accept that the full view image used is the full view image obtained from the database service 116. Once the location of the portion of the full view image corresponding to the key image is known, the matched portion is magnified (Step 914) and displayed to the user (Step 916). These steps are carried out as described in Steps 210 and 212, respectively, of FIG. 2.

If the database service 116 does not find any matches, at least two things can happen: the imaging device 102 can alert the user of a failure via audio and/or visual warnings; or the imaging device 102 can rely upon a local full view image. If audio and/or visual warnings are displayed the user can try again with the desired target object or try a different target object. If this approach is followed, the step of obtaining a full view image from the image sensor (Step 902) is unnecessary. Under the latter approach, however, Step 902 is carried out as Step 202 of FIG. 2, and the full view image captured in the Step 902 can be used as a fall back for failure of the database service. If the database service fails, this exemplary method can proceed as if there wasn't a database service, and the full view image captured by the image sensor can be used. In such a case, the key image is matched against the local full view image as described with FIG. 2 (Step 208). Additionally, the portion of the full view image corresponding to key image is magnified (Step 210) and displayed (Step 212) to the user as described with FIG. 2. Thus, upon failure of the database service, this exemplary method 900 behaves as the exemplary method 200 of FIG. 2.

Upon displaying the magnified portion of the full view image (Step 916), the method, starting with moving the imaging device (Step 904), is repeated such that the display is continuously updated. Like the exemplary method 200 of FIG. 2, this advantageously allows the user to move the imaging device over the target object to change which portion of the full view is being magnified. If the target object is a book, for example, this allows the user to move the imaging device 102 from left to right and up and down the page while magnifying. Thus, the user can advantageously read a book from the display 114 of the imaging device 102 in magnified form. This is useful for those that have trouble seeing or don't have their reading glasses with them.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the application be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A method for electronically magnifying a target object with an imaging device, said method comprising the steps of:
   obtaining a full view image of the target object by use of the electronic imaging device, wherein the full view image of the target object is in focus;
   moving the imaging device in proximity to a portion of the target object;
   obtaining a key image of the portion of the target object, wherein the key image is out of focus as compared to the full view image of the target object;
   matching the out of focus key image to a corresponding portion of the in focus full view image of the target object, wherein the out of focus key image is used to identify the corresponding portion of the in focus full view image of the target object to be displayed;
   magnifying the corresponding portion of the full view image of the target object; and,
   displaying the magnified corresponding portion of the full view image.

2. The method of claim 1, wherein the key image is matched to the corresponding portion of the full view image using fingerprint matching.

3. The method of claim 1, wherein the key image is matched to the corresponding portion of the full view image using both fingerprint matching and visual motion tracking.

4. The method of claim 1, wherein the target object is a document.

5. The method of claim 1, wherein the imaging device is a camera supporting resolutions of at least 2 megapixels.

6. The method of claim 1, wherein the corresponding portion of the full view image is magnified according a selected one of a plurality of fixed magnifications.

7. The method of claim 6, wherein the selected one of the plurality of fixed magnifications is determined based on the distance of the imaging device from the target object.

8. The method of claim 1, wherein the magnification of the corresponding portion of the full view image is proportional to the distance of the imaging device from the target object document.

9. The method of claim 1, wherein the imaging device provides a user of the imaging device with audio and/or visual indications to aid the user in obtaining the full view image.

10. An apparatus for electronically magnifying a target object, said apparatus comprising:
    an image sensor;
    a display; and,
    a controller, wherein said controller is operative to obtain a full view image of the target object from the image sensor, the full view image being in focus, wherein said controller is operative to obtain a key image of a portion of the target object from the image sensor, the key image being out of focus as compared to the full view image, wherein the controller is operative to match the out of focus key image to a corresponding portion of the in focus full view image, wherein the out of focus key image is used to identify the corresponding portion of the in focus full view image to be displayed, wherein the controller is operative to magnify the in focus corresponding portion of the full view image, and wherein the controller is operative to provide the display with a video stream of the magnified corresponding portion of the full view image.

11. The apparatus of claim 10, wherein the target object is a document.

12. The apparatus of claim 10, wherein the image sensor is a camera supporting resolutions of at least 2 megapixels.

13. The apparatus of claim 10, further comprising a speaker, wherein the speaker and the display are operative to provide a user of the system with audio and/or visual indications to aid the user in obtaining the full view image.

14. A method for electronically magnifying a target object with an imaging device, said method comprising:
    moving the imaging device in proximity to a portion of the target object;
    obtaining a key image of the portion of the target object, wherein the key image is out of focus;
    sending the out of focus key image to a database service, wherein the database service is operative to match the out of focus key image to a corresponding portion of an in focus full view image in one of at least one of databases associated with the database service, wherein the out of focus key image is used to identify a corresponding portion of the in focus full view image;
obtaining the matched in focus full view image from the database service;
magnifying the corresponding portion of the in focus full view image; and, displaying the magnified corresponding portion of the in focus full view image.

15. The method of claim 14, wherein the database service failed to match the key image to a corresponding portion of a full view image in one of the at least one databases associated with the database service, further comprising:
obtaining a local full view image of the target object; and,
matching the key image to a corresponding portion of the local full view image.

16. The method of claim 14, wherein the key image is matched to the corresponding portion of the full view image using fingerprint matching.

17. The method of claim 14, wherein the target object is a document.

18. The method of claim 14, wherein the corresponding portion of the full view image is magnified according a selected one of a plurality of fixed magnifications.

19. The method of claim 1 further including following the step of displaying the magnified corresponding portion of the full view image, moving the image device over the target object to another region of the target object, and changing which portion of the target object is being magnified, wherein the displaying is continuously updated.

20. The method according to claim 1 wherein in the displaying step only the magnified corresponding portion of the full view image is displayed.

* * * * *